United States Patent
Noda (10) Patent No.: US 9,405,393 B2
(45) Date of Patent: Aug. 2, 2016

(54) INFORMATION PROCESSING DEVICE, INFORMATION PROCESSING METHOD AND COMPUTER PROGRAM

(75) Inventor: Takuro Noda, Tokyo (JP)

(73) Assignee: SONY CORPORATION, Tokyo (JP)

( * ) Notice: Subject to any disclaimer, the term of this patent is extended or adjusted under 35 U.S.C. 154(b) by 28 days.

(21) Appl. No.: 14/348,038

(22) PCT Filed: Jul. 20, 2012

(86) PCT No.: PCT/JP2012/068453
§ 371 (c)(1),
(2), (4) Date: Mar. 27, 2014

(87) PCT Pub. No.: WO2013/051318
PCT Pub. Date: Apr. 11, 2013

(65) Prior Publication Data
US 2014/0232678 A1    Aug. 21, 2014

(30) Foreign Application Priority Data
Oct. 4, 2011  (JP) .................................. 2011-219946

(51) Int. Cl.
*G06F 3/041*    (2006.01)
*G06F 3/0488*   (2013.01)

(52) U.S. Cl.
CPC ............ *G06F 3/0414* (2013.01); *G06F 3/0488* (2013.01); *G06F 3/04883* (2013.01)

(58) Field of Classification Search
CPC ................................ G06F 3/041–3/047; G06F 2203/04101–2203/04113
USPC .......... 345/173–178; 178/18.01–18.09, 18.11
See application file for complete search history.

(56) References Cited

U.S. PATENT DOCUMENTS

| | | | |
|---|---|---|---|
| 2007/0040813 A1* | 2/2007 | Kushler et al. ................ | 345/173 |
| 2009/0174679 A1* | 7/2009 | Westerman ................... | 345/173 |
| 2010/0103136 A1* | 4/2010 | Ono et al. ..................... | 345/173 |
| 2011/0164060 A1 | 7/2011 | Miyazawa et al. | |
| 2011/0316807 A1* | 12/2011 | Corrion ......................... | 345/174 |

FOREIGN PATENT DOCUMENTS

| | | |
|---|---|---|
| CN | 102122226 | 7/2011 |
| JP | 2000-39964 | 2/2000 |
| JP | 2009-157908 | 7/2009 |
| JP | 2010-108061 | 5/2010 |
| JP | 2011-141753 | 7/2011 |

* cited by examiner

*Primary Examiner* — Stephen Sherman
(74) *Attorney, Agent, or Firm* — Fromer Lawrence & Haug LLP; William S. Frommer

(57) ABSTRACT

Provided is an information processing device including a detection area determination unit configured to determine whether a contact position of an input object is in a contact determination area which is a part of a detection area of a detection unit based on a detection signal from the detection unit that detects contact of the input object with a contact detection surface, a manipulation determination unit configured to determine manipulation content from movement of the input object when the detection area determination unit determines that the input object is in contact with an inside of the contact determination area, and an event issuing unit configured to issue an event according to the manipulation content determined by the manipulation determination unit.

6 Claims, 5 Drawing Sheets

INFORMATION PROCESSING DEVICE, INFORMATION PROCESSING METHOD AND COMPUTER PROGRAM

TECHNICAL FIELD

The present disclosure relates to an information processing device, an information processing method and a computer program, and more specifically, to an information processing device, an information processing method and a computer program that detect a manipulation input of an input object using a touch sensor.

BACKGROUND ART

There is an input device using a sensor, such as a touch panel, as a controller for a GUI (Graphical User Interface) widely used as a smart phone, a tablet terminal or the like.

In an input device of the related art, a sensor is mainly provided in only a surface on which a display unit is provided. However, in such an input device, a manipulation input is performed from the surface, such that information displayed on the display unit is hidden by a finger, which deteriorates operability. In recent years, as resolution in a display unit has become higher, operability is considered to be further deteriorated. Further, an input manipulation from the surface is easily seen by others and, for example, when highly confidential information such as a password number is input, it is difficult to hide the input information. Further, with the recent increase in touch manipulation variations, operations (gestures) upon input manipulation conflict such that malfunction easily occurs and the operability is deteriorated.

In recent years, touch panels capable of simultaneously detecting contacts of a plurality of fingers, that is, so-called multi-touch, have also begun to spread. Further, as a plurality of sensors is included in a device, improvement of operability has been realized (e.g., Patent Literatures 1 and 2). In such a device, as one touch sensor is provided in an opposite surface (a back surface) of a display unit of the device to detect contact of a finger, a manipulation input can be performed on a side of the back surface, and a display screen is not hidden by a finger even when the device is small. Further, intuitive interaction or expansion of a manipulation system, which has not been realized in a touch panel with a plurality of sensors in related art, can be realized.

CITATION LIST

Patent Literature

Patent Literature 1: JP 2010-108061A
Patent Literature 2: JP 2009-157908A

SUMMARY OF INVENTION

Technical Problem

However, when a sensor is arranged in a back surface that it is difficult for a user to see and recognize in use, a manipulation to designate a position with an absolute coordinate is difficult, such as a manipulation to touch a specific button displayed on a display surface or an input of letters. Because of this, it is effective for such a sensor to be used to detect an intuitive manipulation input such as gesture.

Here, when a touch pad is arranged as a sensor in a position in which it is difficult for the user to directly see during use, it is difficult to recognize an outer circumference of the touch pad, and contact of a finger with the touch pad is likely to occur even when the user does not intend to come in contact with the touch pad. In particular, when the finger comes in contact with the vicinity of a boundary of the touch pad, a sensor value output from the touch pad becomes unstable, and thus it is likely to be erroneously detected as performance of a tap manipulation.

Therefore, when the sensor is arranged in the position in which it is difficult for the user to directly see during use, it is necessary to remove erroneous detection of the tap manipulation using the sensor and prevent occurrence of malfunction.

Solution to Problem

According to the present disclosure, there is provided an information processing device including a detection area determination unit configured to determine whether a contact position of an input object is in a contact determination area which is a part of a detection area of a detection unit based on a detection signal from the detection unit that detects contact of the input object with a contact detection surface, a manipulation determination unit configured to determine manipulation content from movement of the input object when the detection area determination unit determines that the input object is in contact with an inside of the contact determination area, and an event issuing unit configured to issue an event according to the manipulation content determined by the manipulation determination unit.

According to the present disclosure, the detection determination area in which the contact of the input object with the contact detection surface is detected is set as a part of the detection area of the detection unit and thus is set to have a smaller area than the detection area. In this manner, even when a user unintentionally brings the input object in contact with the contact detection surface, an event corresponding to manipulation content of the input object is not issued when a position with which the input object comes in contact is outside the detection determination area.

According to the present disclosure, there is provided an information processing method including the steps of determining whether a contact position of an input object is in a contact determination area which is a part of a detection area of a detection unit based on a detection signal from the detection unit that detects contact of the input object with a contact detection surface, determining manipulation content from movement of the input object when it is determined that the input object is in contact with an inside of the contact determination area, and issuing an event according to the manipulation content.

According to the present disclosure, there is provided a computer program causing a computer to function as an information processing device, the information processing device including a detection area determination unit configured to determine whether a contact position of an input object is in a contact determination area which is a part of a detection area of a detection unit based on a detection signal from the detection unit that detects contact of the input object with a contact detection surface, a manipulation determination unit configured to determine manipulation content from movement of the input object when the detection area determination unit determines that the input object is in contact with an inside of the contact determination area, and an event issuing unit configured to issue an event according to the manipulation content determined by the manipulation determination unit.

Advantageous Effects of Invention

As described above, according to an embodiment of the present disclosure, it is possible to provide an information processing device, an information processing method, and a computer program that can prevent erroneous detection of the tap manipulation using the sensor that is arranged in a position in which it is difficult for a user to directly see during use.

DESCRIPTION OF EMBODIMENTS

Hereinafter, preferred embodiments of the present disclosure will be described in detail with reference to the appended drawings. In this specification and the drawings, elements that have substantially the same functional configuration are denoted with the same reference signs, and repeated explanation is omitted.

Description will be provided in the following order.
1. Overview of tap determination
1-1. Determination area of touch sensor
1-2. General tap manipulation determination process
2. Configuration of information processing device
3. Tap manipulation determination process
4. Setting change of contact determination area
5. Exemplary hardware configuration
(1. Overview of Tap Determination)
(1-1. Determination Area of Touch Sensor)

Figure 1:
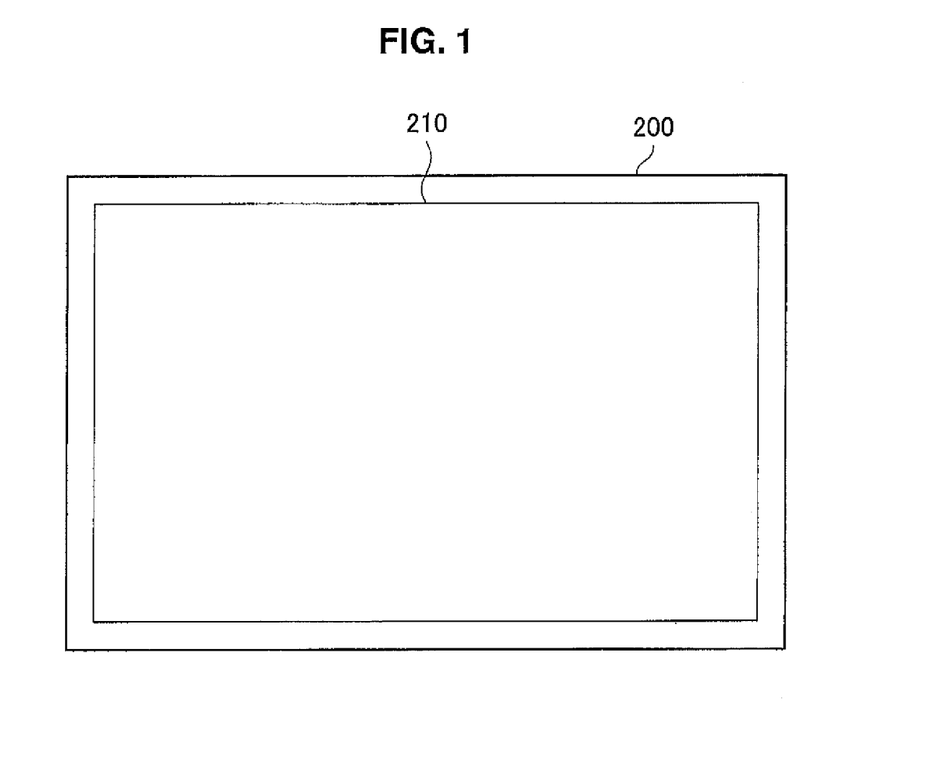
FIG. 1 is a diagram illustrating a determination area that determines contact of an input object using an information processing device according to an embodiment of the present disclosure.

First, an overview of tap determination according to the present technology will be described with reference to FIG. 1. FIG. 1 is an explanatory diagram illustrating a determination area that determines contact of an input object using an information processing device according to the embodiment.

The information processing device according to the embodiment is a device that determines a manipulation input performed by a user based on a contact detection result of the input object such as a finger using a touch sensor, and issues an event corresponding to the manipulation input. In order to prevent the user's unintentional contact of a finger with the touch sensor from being erroneously determined as performance of a tap manipulation, the information processing device performs determination of the tap manipulation by narrowing a contact determination area when the input object comes in contact with the touch sensor.

Specifically, for example, as shown in FIG. 1, with respect to a detection area 200 of an entire touch sensor, a contact determination area 210 can be set as an area that is one size smaller than the detection area 200. As described above, particularly when a finger comes in contact with the vicinity of a boundary of the touch sensor, a sensor value output from the touch sensor becomes unstable and thus erroneous detection of the tap manipulation is likely to occur. For this reason, as shown in FIG. 1, an outer circumferential portion of the detection area 200 of the entire touch sensor is excluded from the contact determination area 210 that determines contact of the input object contacts such that an event is not issued when the input object comes in contact with the outer circumferential portion of the detection area 200.

(1-2. General Tap Manipulation Determination Process)

Figure 2:
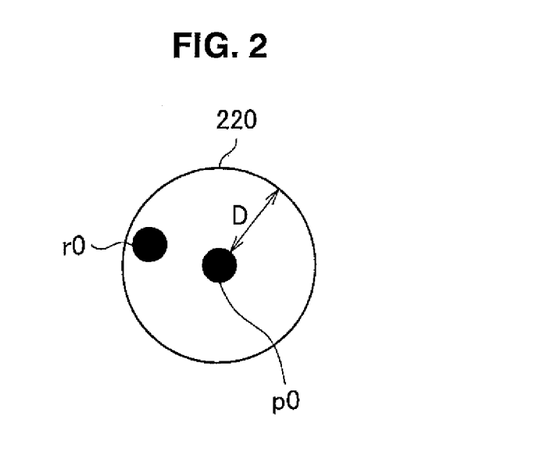
FIG. 2 is an explanatory diagram illustrating a relation between a touch point and a release point in a general tap manipulation determination process.

Here, a general tap manipulation determination process will be described with reference to FIG. 2. FIG. 2 is an explanatory diagram illustrating a relation between a touch point and a release point in the general tap manipulation determination process.

When the touch sensor detects the contact of the input object with the contact detection surface, the touch sensor outputs a detection signal indicating a contact state of the input object to the information processing device. A detection ID that is unique information assigned to specify the contact of the input object, position information p0(x0, y0) indicating the contact position of the input object on the contact detection surface, and a contact time t0 are contained in the detection signal. The information processing device records each piece of information of the detection signal received from the touch sensor in the memory.

The information processing device continuously monitors the detection signal for the detection ID assigned to the input object contacting the contact detection surface. Also, when the input object is moved a predetermined distance (hereinafter, also referred to as "a tap determination distance") D or more from the contact position p0, the information processing device determines that the input object does not perform the tap manipulation and stops monitoring the detection signal of the detection ID. Meanwhile, when the input object is separated from the contact detection surface, the information processing device determines that a series of motions performed by the input object is the tap manipulation when the movement distance from the contact position p0 is smaller than the tap determination distance D and a contact time between the contact of the input object with the contact detection surface and the separation is less than a predetermined time (hereinafter, also referred to as "a tap determination time") T. That is, when the input object is separated from the contact detection surface within a tap determination time T in a circular tap determination area 220 of a radius D having the touch point p0 shown in FIG. 2 as a center, the information processing device determines the manipulation to be the tap manipulation.

The information processing device according to the embodiment determines whether the tap manipulation is performed based on, for example, the tap manipulation determination process. However, in the tap manipulation determination process, erroneous detection of the tap manipulation is prevented by narrowing the contact determination area when the input object comes in contact with the touch sensor. Hereinafter, a configuration of the information processing device according to the embodiment and a tap manipulation determination process using the same will be described in detail with reference to FIGS. 3 to 7.

(2. Configuration of Information Processing Device)

Figure 3:
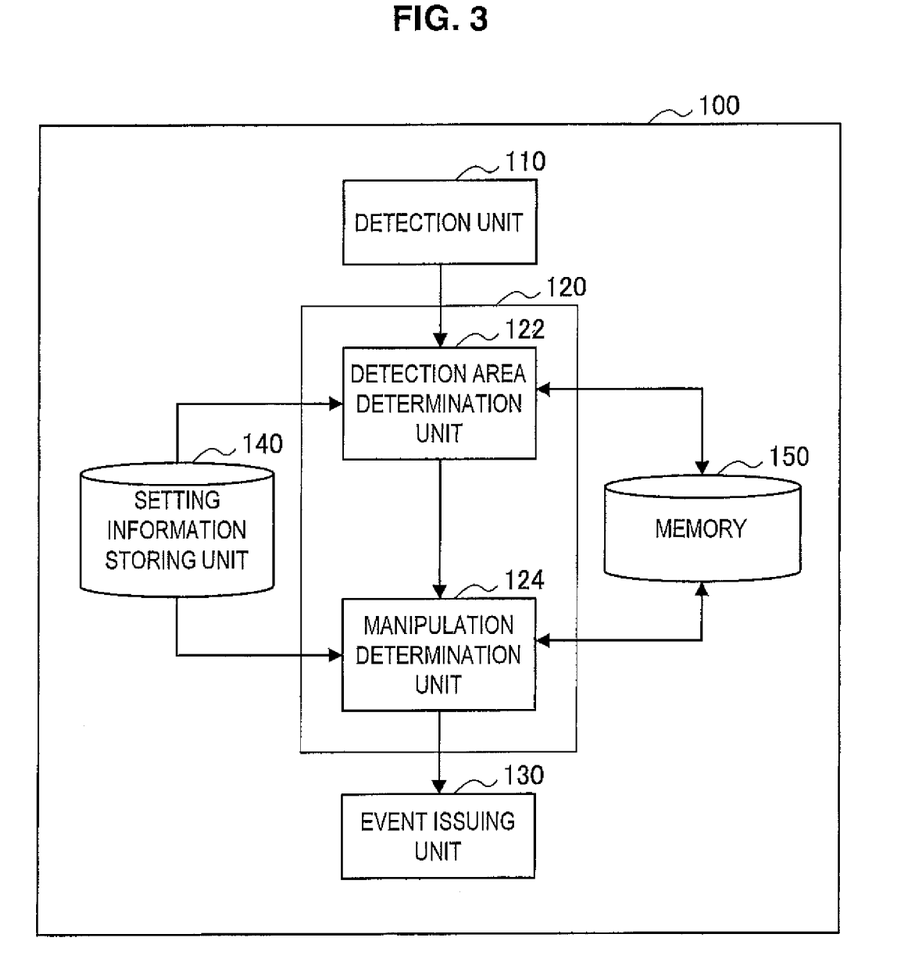
FIG. 3 is a functional block diagram illustrating a functional configuration of the information processing device according to the embodiment.

FIG. 3 illustrates a functional configuration of an information processing device 100 according to the embodiment. As shown in FIG. 3, the information processing device 100 includes a detection unit 110, a determination processing unit 120, an event issuing unit 130, a setting information storing unit 140, and a memory 150.

The detection unit 110 is one of input devices used by a user to input information, and detects contact of a place of an input object such as a finger. For example, an electrostatic touch panel in which contact of an input object is detected by sensing an electrical signal resulting from static electricity, a pressure-sensitive touch panel in which a change in pressure applied to a back surface is sensed to detect contact of a finger, or the like may be used as the detection unit 110. When the detection unit 110 detects contact of the input object, the detection unit 110 outputs a detection ID, position information p0(x0, y0), and a contact time t0 assigned to specify the contact of the input object, as a detection signal, to the determination processing unit 120.

The determination processing unit 120 is a processing unit for analyzing a motion of the input object to determine whether a tap manipulation is performed. The determination processing unit 120 includes a detection area determination unit 122 and a manipulation determination unit 124.

The detection area determination unit 122 determines whether an input object comes in contact with a contact determination area 210 based on position information of a detection signal from the detection unit 110. Referring to the setting information storing unit 140, the detection area determination unit 122 obtains a range of the contact determination area 210 used for contact determination of the input object in the detection area 200 of the detection unit 110. Also, the detection area determination unit 122 determines whether a contact position of the input object is included in the contact determination area 210 from the position information of the detection signal.

When the detection area determination unit 122 determines that the contact position of the input object is included in the contact determination area 210, the detection area determination unit 122 instructs the manipulation determination unit 124 to continuously monitor the detection signal for the detection ID assigned to the contact operation of the input object. In this case, the detection area determination unit 122 records the information contained in the detection signal received from the detection unit 110, that is, the detection ID, the position information and the contact time, in the memory 150.

The manipulation determination unit 124 determines a manipulation input performed by the user from movement of the input object in contact with the contact determination area 210. The manipulation determination unit 124 determines whether the tap manipulation is performed by monitoring the movement of the input object based on, for example, the above-described tap manipulation determination process. Then, when it is determined that the tap manipulation is performed, the manipulation determination unit 124 instructs the event issuing unit 130 to issue an event to be executed by a touch manipulation. On the other hand when it is determined that the touch manipulation is not performed, the manipulation determination unit 124 does not instruct the event issuing unit 130 to issue an event.

Details of the tap manipulation determination process in the manipulation processing unit 120 will be described in detail with reference to FIG. 4 later.

The event issuing unit 130 issues an event based on instruction of the manipulation determination unit 124. In the embodiment, when it is determined by the manipulation determination unit 124 that the input object has been performed the tap manipulation, the event issuing unit 130 issues an event related to the tap manipulation.

The setting information storing unit 140 stores various types of setting information necessary for the tap manipulation determination process. The setting information storing unit 140 stores, for example, area information indicating a range of the contact determination area 210 or, the tap determination distance D for determining the tap manipulation and the tap determination time T. This information may be stored in the setting information storing unit 140 in advance or may be appropriately set and stored by the user.

The memory 150 is a storage unit for temporarily storing information necessary for the tap manipulation determination process. For example, the information contained in the detection signal received from the detection unit 110 is recorded in the memory 150.

(3. Tap Manipulation Determination Process)

Figure 4:
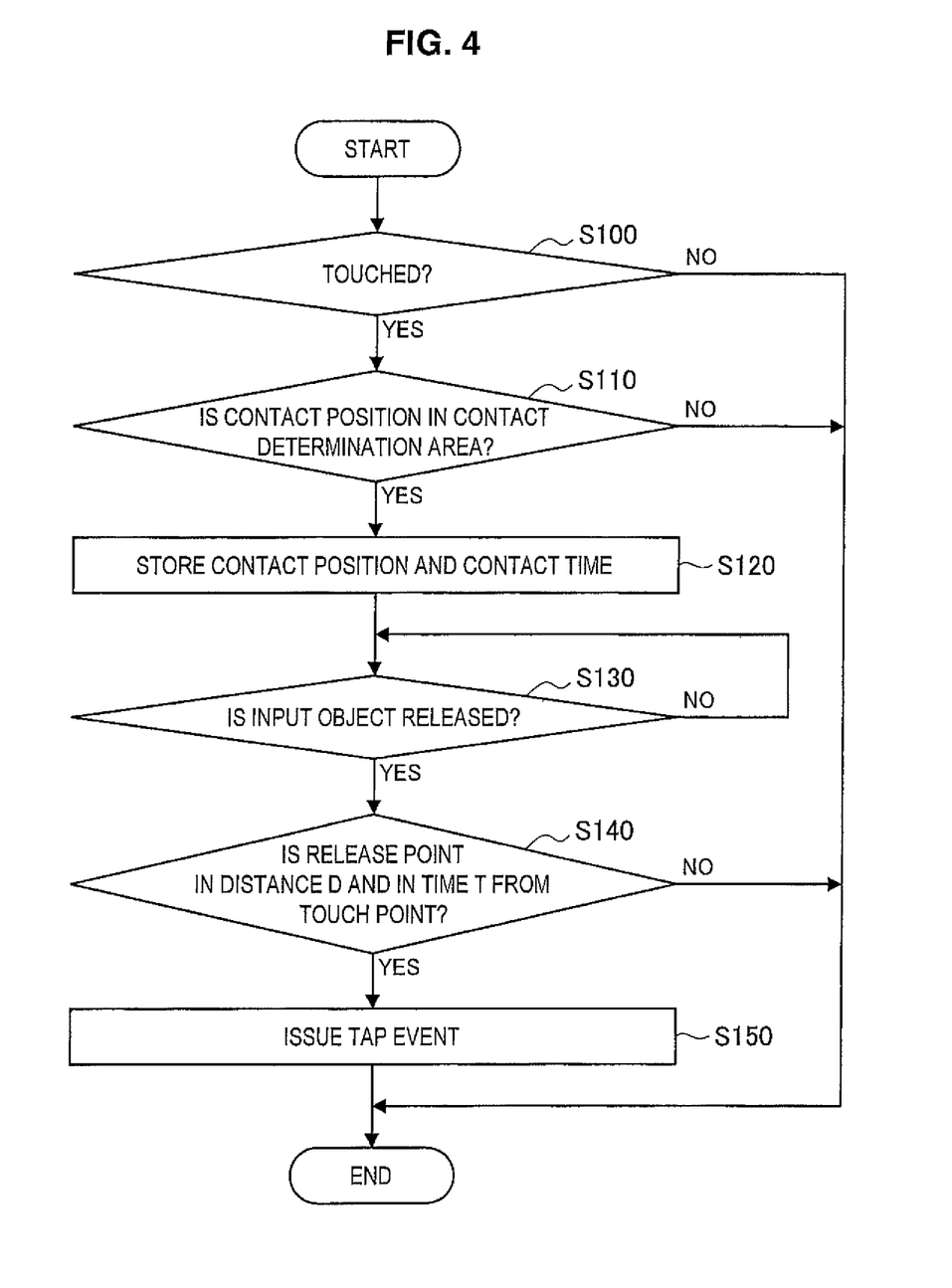
FIG. 4 is a flowchart illustrating a tap manipulation determination process using the information processing device according to the embodiment.

The information processing device 100 performs a tap manipulation determination process according to a flowchart shown in FIG. 4. Here, the detection unit 110 is assumed to continuously monitor whether there is the contact of the input object with the contact detection surface (S100). The detection unit 110 iteratively performs the process of step S100 until the detection unit 110 detects the contact of the input object with the contact detection surface. Also, if the detection unit 110 detects the contact of the input object with the contact detection surface, the detection unit 110 outputs a detection signal to the detection area determination unit 122.

When the detection area determination unit 122 receives the detection signal from the detection unit 110, the detection area determination unit 122 determines whether a contact position of the input object with the contact detection surface is in the contact determination area 210 (S110). As described in FIG. 1, the contact determination area 210 is, for example, a portion of the detection area 200, and may be set to exclude an area of the detection area 210 that a finger of a user is highly likely to unintentionally contact. When the detection area determination unit 122 determines that the contact position of the input object is not in the contact determination area 210, the detection area determination unit 122 ends the process shown in FIG. 4 and repeatedly performs the process from step S100. That is, through the process in step S110, even when the input object of the user unintentionally contacts the detection area 200 excluded from the contact determination area 210, the contact of the input object is neglected. Thus, it is possible to reduce possibility of a wrong event being issued.

Meanwhile, if it is determined in step S110 that there is the contact position of the input object in the contact determination area 210, the detection area determination unit 122 records a contact position and a contact time of the input object in association with a detection ID in the memory 150 (S120). Also, the manipulation determination unit 124 continues to monitor the detection signal for the detection ID and determines whether the input object is separated (released) from the contact detection surface (S130). The process of step S130 is repeated until the input object release is detected.

When release of the input object is detected in step S130, the manipulation determination unit 124 determines whether the tap manipulation is performed based on a distance between the contact position and a separation position of the input object, and a time from the contact of the input object with the contact detection surface to the separation (S140). As shown in FIG. 2, the tap manipulation can be determined based on whether a movement distance between a release point p0 that is the contact position of the input object and a release point r0 that is the separation position is less than the tap determination distance D, and whether a contact time from the contact of the input object with the contact detection surface and the separation is less than the tap determination time T.

The manipulation determination unit 124 calculates the movement distance and the contact time from a detection signal when the input object stored in the memory 150 comes in contact with the contact detection surface and a detection signal when release of the input object is detected. Also, the manipulation determination unit 124 obtains the tap determination distance D and the tap determination time T from the setting information storing unit 140, and performs comparison with the calculated movement distance and contact time. Also, when the movement distance of the input object is less than the tap determination distance D and the contact time of the input object is less than the tap determination time T, the manipulation determination unit 124 determines that the tap manipulation has been performed and issues an event corresponding to the tap manipulation (S150). On the other hand, when a condition in which the movement distance of the input object is less than the tap determination distance D and the contact time of the input object is less than the tap determination time T is not satisfied, the manipulation determination unit 124 ends the process shown in FIG. 4 and repeatedly performs the process from step S100.

The tap manipulation determination process using the information processing device 100 according to the embodiment has been described. According to the tap manipulation determination process shown in FIG. 4, it is decided whether the manipulation input is determined according to the contact position when the input object comes in contact with the contact detection surface. When the contact position is outside the contact determination area 210, it is determined that the user has caused unintentional contact of the input object. An event is not issued by movement of the input object at this time.

Figure 5:
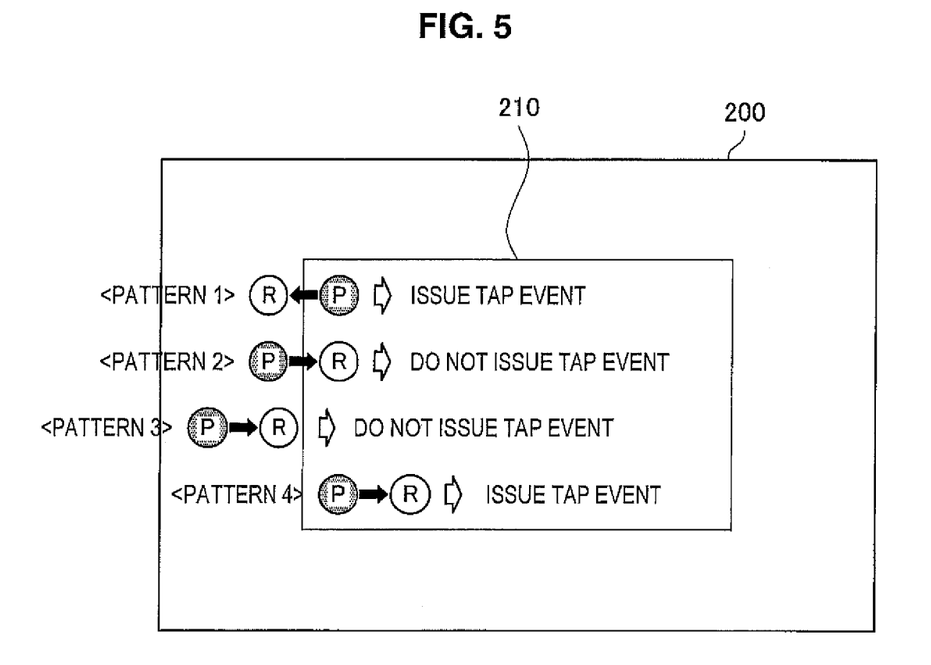
FIG. 5 is an explanatory diagram illustrating whether an event corresponding to a tap manipulation is issued in four patterns of a contact position and a separation position of the input object.

FIG. 5 illustrates whether an event corresponding to a tap manipulation is issued in four patterns of a contact position and a separation position of the input object. In FIG. 5, "P" indicates the contact position (touch point) of the input object and "R" indicates the separation position (release point) of the input object.

In the tap manipulation determination process by the information processing device 100 according to the embodiment, when the contact position of the input object is in the contact determination area 210, an event corresponding to a manipulation is issued. Therefore, in a pattern 1 and a pattern 4 in which the touch point is in the contact determination area 210, when movement of the input object is determined to be the tap manipulation, an event corresponding to the tap manipulation is issued. On the other hand, in a pattern 2 and a pattern 3 in which the touch point is outside the contact determination area 210, the contact of the input object is neglected and an event corresponding to a manipulation input by the input object is not issued. In this manner, the contact determination area 210 that is narrower than the detection area 200 is provided, and thereby it is possible to manipulate whether an event is issued according to the contact position of the input object.

(4. Setting Change of Contact Determination Area)

In the above-described example, the contact determination area 210, which is a detection area when the input object comes in contact with the contact detection surface, is set in advance and a range of the area is fixed, but the contact determination area 210 may be set to be variable. The contact determination area 210 is set to exclude from the detection area 200 an area in which the user causes unintentional contact of the input object. Therefore, for example, when there is a portion in which contact and separation of the input object are frequently generated in the vicinity of the outer circumference of the detection area 200 from the detection signal of the detection unit 110, the contact determination area 210 in which a corresponding portion is excluded may be newly set.

Figure 6:
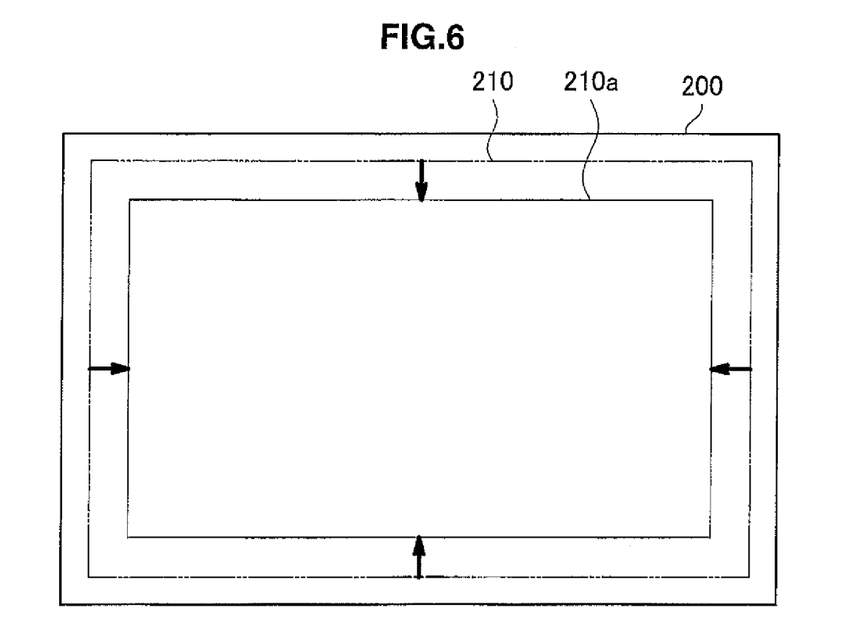
FIG. 6 is an explanatory diagram illustrating a setting change of a contact determination area.

As an example of changing the contact determination area 210, for example, as shown in FIG. 6, it is assumed that the contact determination area 210 is set in advance with respect to the detection area 200. The contact determination area 210 is set such that the outer circumferential portion is excluded from the detection area 200. In this manner, when the tap manipulation determination process is executed in a state in which the contact determination area 210 is set, it is further recognized that the contact and the separation of the input object are frequently generated in the outer circumferential portion of the contact determination area 210 from the detection signal of the detection unit 110. In this case, the information processing device 100 may set a new contact determination area 210a by further narrowing the contact determination area 210 using, for example, the detection area determination unit 122. Accordingly, it is possible to more effectively prevent the event from occurring due to the user causing unintentional contact of the input object.

In the example in FIG. 6, the contact determination area 210 is set to be a shape similar to the detection area 200, but the present technology is not limited to thereto. For example, when the contact and the separation of the input object are frequently generated in a portion of the detection area 200, the contact determination area 210 may be set such that a corresponding portion is excluded.

(5. Exemplary Hardware Configuration)

Figure 7:
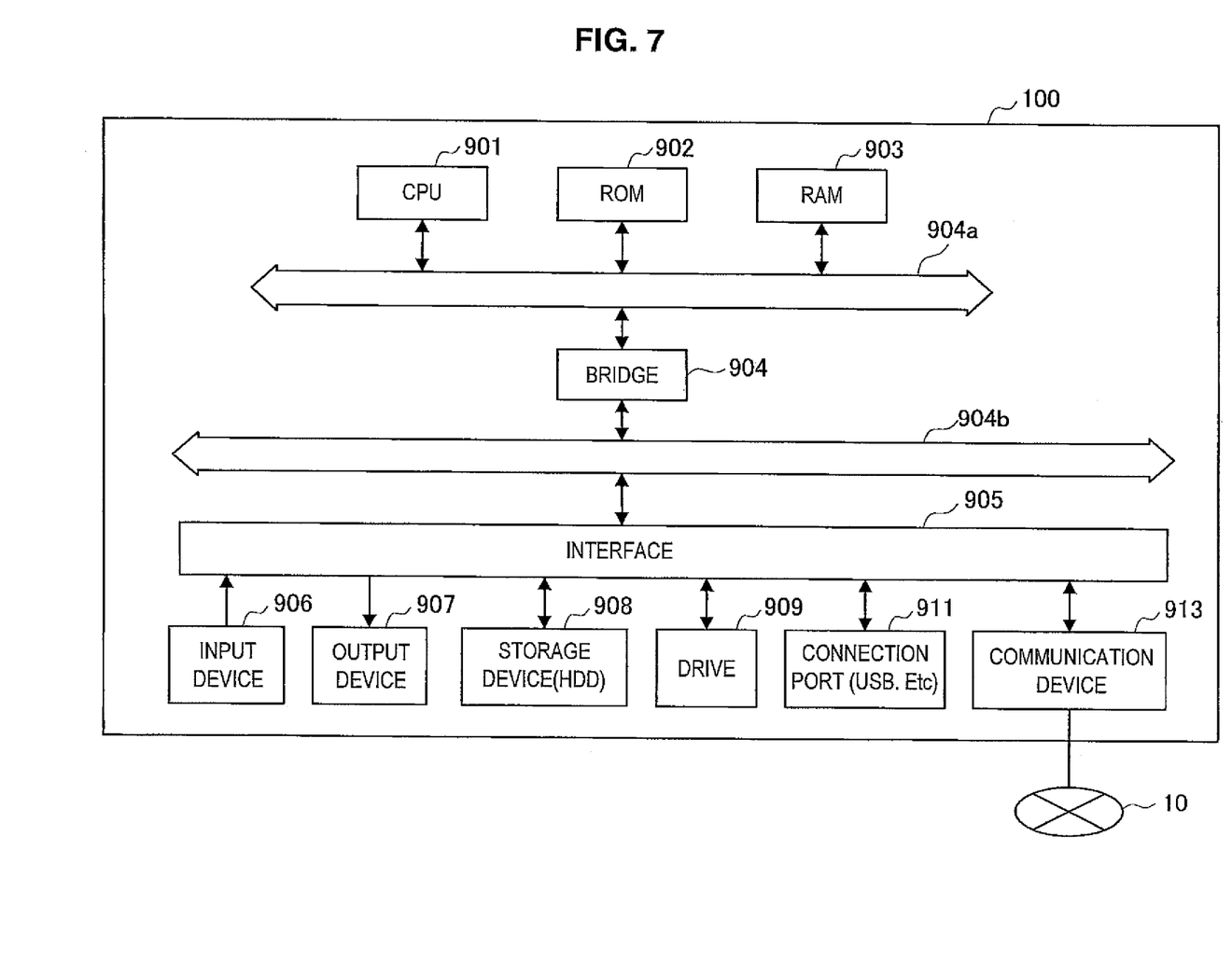
FIG. 7 is a block diagram illustrating an exemplary hardware configuration of the information processing device according to the embodiment.

A process of the information processing device 100 in accordance with this embodiment can be executed either by hardware or software. In this case, the information processing device can be configured as shown in FIG. 7. Hereinafter, an exemplary hardware configuration of the information processing device 100 in accordance with this embodiment will be described with reference to FIG. 7.

The information processing device 100 in accordance with this embodiment can be implemented by a processing device such as a computer as described above. As shown in FIG. 7, the information processing device 100 includes a CPU (Central Processing Unit) 901, ROM (Read Only Memory) 902, RAM (Random Access Memory) 903, and a host bus 904a. In addition, the information processing device 100 also includes a bridge 904, an external bus 904b, an interface 905, an input device 906, an output device 907, a storage device (HDD) 908, a drive 909, a connection port 911, and a communication device 913.

The CPU 901 functions as an arithmetic processing unit and a control unit, and controls the entire operation within the information processing device 100 in accordance with various programs. The CPU 901 may also be a microprocessor. The ROM 902 stores programs, operation parameters, and the like used by the CPU 901. The RAM 903 temporarily stores programs used in the execution of the CPU 901, parameters that change as appropriate during the execution, and the like. These units are mutually connected via the host bus 904a including a CPU bus or the like.

The host bus 904a is connected to the external bus 904b such as a PCI (Peripheral Component Interconnect/Interface) bus via the bridge 904. Note that the host bus 904a, the bridge 904, and the external bus 904b need not necessarily be arranged separately, and the functions of such components may be integrated into a single bus.

The input device 906 includes an input means for a user to input information, such as a mouse, a keyboard, a touch panel, a button, a microphone, a switch, or a lever; an input control circuit that generates an input signal on the basis of a user input and outputs the signal to the CPU. 901; and the like. The output device 907 includes a display device such as, for example, a liquid crystal display (LCD) device, an OLED (Organic Light Emitting Diode) device, or a lamp; and an audio output device such as a speaker.

The storage device 908 is a device for storing data, constructed as an example of a storage unit of the information processing device 100. The storage device 908 can include a storage medium, a recording device that records data on the storage medium, a reading device that reads data from the storage medium, a deletion device that deletes data recorded on the storage medium, and the like. The storage device 908 includes, for example, a HDD (Hard Disk Drive). The storage device 908 stores programs and various data for driving the hard disk and executed by the CPU 901.

The drive 909 is a reader/writer for a storage medium, and is incorporated in or externally attached to the information processing device 100. The drive 909 reads information recorded on a removable storage medium such as a magnetic disk, an optical disc, a magnetooptical disk, or semiconductor memory that is mounted, and outputs the information to the RAM 903.

The communication port 911 is an interface for connection to an external device, and is, for example, a connection port for connection to an external device that can transmit data via a USB (Universal Serial Bus). The communication device 913 is, for example, a communication interface including a communication device and the like for connection to the communication network 10. The communication device 913 may be any of a communication device supporting a wireless LAN (Local Area Network), a communication device supporting a wireless USB, or a wire communication device that performs wire communication.

While exemplary embodiments of the present disclosure have been described in detail with reference to the accompanying drawings, the scope of the present disclosure is not limited thereto. It is apparent to those skilled in the art that various changes and modifications fall within the scope and spirit of the present disclosure described in the appended claims and will be construed as being included in the scope of the present disclosure.

For example, in the embodiment, an example in which the touch sensor is provided in a side of the back surface of a terminal as the detection unit, but the present technology is not limited thereto. For example, the tap manipulation determination process using the information processing device 100 of the present technology may be applied to a touch sensor provided in a surface other than a rear surface or a side surface of the terminal in which it is difficult for the user to see when the user manipulates.

In addition, in the embodiment, while the detection unit 110 has been described as an element of the information processing device 100, the present technology is not limited thereto. The detection unit 110 may be separately provided from the information processing device 100 and it is sufficient if the information processing device 100 is able to receive the detection signal of the detection unit 110.

Additionally, the present technology may also be configured as below.

(1)

An information processing device including:

a detection area determination unit configured to determine whether a contact position of an input object is in a contact determination area which is a part of a detection area of a detection unit based on a detection signal from the detection unit that detects contact of the input object with a contact detection surface;

a manipulation determination unit configured to determine manipulation content from movement of the input object when the detection area determination unit determines that the input object is in contact with an inside of the contact determination area; and an event issuing unit configured to issue an event according to the manipulation content determined by the manipulation determination unit.

(2)

The information processing device according to (1), wherein the contact determination area is set by excluding a portion of the detection area in which contact and separation of the input object frequently occur.

(3)

The information processing device according to (1) or (2), wherein the detection area determination unit changes the contact determination area based on the detection signal.

(4)

The information processing device according to any one of (1) to (3), wherein, when a tap manipulation is determined by the information processing device, the manipulation determination unit calculates a movement distance from the contact position of the input object to a separation position and a contact time from contact of the input object with the contact detection surface to separation based on the detection signal, and the manipulation determination unit determines the movement of the input object as a tap manipulation in a case where the movement time is less than a predetermined distance and the contact time is less than a predetermined time.

(5)

The information processing device according to any one of (1) to (4), wherein the contact detection surface of the detection unit is arranged in a position in which a user who manipulates a terminal is unable to see the contact detection surface in manipulating the terminal.

REFERENCE SIGNS LIST

100 information processing device
110 detection unit
120 determination processing unit
122 detection area determination unit
124 manipulation determination unit
130 event issuing unit
140 setting information storing unit
150 memory
200 detection area
210 contact determination area
220 tap determination area

The invention claimed is:

1. An information processing device comprising:
a detection area determination unit configured to determine whether a contact position of an input object is in a contact determination area of a touch-sensitive detection unit, the contact determination area being included within a detection area of the touch-sensitive detection unit, the touch-sensitive detection unit detecting contact of the input object with a contact detection surface of the detection area to produce a detection signal including position information representing the contact position of the input object on the contact detection surface and contact time information representing time of contact, the detection area determination unit being configured to determine a separation position at which the input object leaves contact with the detection area and separation time information representing time of separation of the input object from the detection area;

a manipulation determination unit configured to determine manipulation content from movement of the input object when the detection area determination unit determines that the input object is in contact with an inside of the contact determination area, the manipulation determination unit determining separation of the input object from the contact detection surface and, when separation is determined, the manipulation determination unit determines (a) distance between the contact position and the separation position and (b) contact time duration between the time of contact and time of separation of the input object; and an event issuing unit configured to issue an event according to the manipulation content determined by the manipulation determination unit, including a tap event when the contact time duration is less than a predetermined amount, the distance between the contact position and the separation position is less than a predetermined amount, and the contact position is within the contact determination area even if the separation position is outside the contact determination area.

2. The information processing device according to claim 1, wherein the contact determination area is set by excluding a portion of the detection area in which contact and separation of the input object frequently occur.

3. The information processing device according to claim 1, wherein the detection area determination unit changes the contact determination area based on the detection signal.

4. The information processing device according to claim 1, wherein the contact detection surface of the detection unit is arranged in a position in which a user who manipulates a terminal is unable to see the contact detection surface in manipulating the terminal.

5. An information processing method comprising the steps of:
  determining whether a contact position of an input object is in a contact determination area of a touch-sensitive detection unit, the contact determination area being included within a detection area of a touch-sensitive detection unit, the touch-sensitive detection unit detecting contact of the input object with a contact detection surface of the detection area to produce a detection signal including position information representing the contact position of the input object on the contact detection surface and contact time information representing time of contact;
  determining a separation position at which the input object leaves contact with the detection area and separation time information representing time of separation of the input object from the detection area;
  determining manipulation content from movement of the input object when it is determined that the input object is in contact with an inside of the contact determination area;
  determining separation of the input object from the contact detection surface and, when separation is determined, determining (a) distance between the contact position and the separation position and (b) contact time duration between the time of contact and time of separation of the input object; and
  issuing an event according to the manipulation content, including a tap event when the contact time duration is less than a predetermined amount, the distance between the contact position and the separation position is less than a predetermined amount, and the contact position is within the contact determination area even if the separation position is outside the contact determination area.

6. A non-transitory computer readable medium on which is recorded a computer program causing a computer to function as an information processing device, the information processing device including
  a detection area determination unit configured to determine whether a contact position of an input object is in a contact determination area of a touch-sensitive detection unit, the contact determination area being included within a detection area of the touch-sensitive detection unit, the touch-sensitive detection unit detecting contact of the input object with a contact detection surface of the detection area to produce a detection signal including position information representing the contact position of the input object on the contact detection surface and contact time information representing time of contact, the detection area determination unit being configured to determine a separation position at which the input object leaves contact with the detection area and separation time information representing time of separation of the input object from the detection area,
  a manipulation determination unit configured to determine manipulation content from movement of the input object when the detection area determination unit determines that the input object is in contact with an inside of the contact determination area, the manipulation determination unit determining separation of the input object from the contact detection surface and, when separation is determined, the manipulation determination unit determines (a) distance between the contact position and the separation position and (b) contact time duration between the time of contact and time of separation of the input object, and
  an event issuing unit configured to issue an event according to the manipulation content determined by the manipulation determination unit, including a tap event when the contact time duration is less than a predetermined amount, the distance between the contact position and the separation position is less than a predetermined amount, and the contact position is within the contact determination area even if the separation position is outside the contact determination area.

* * * * *